United States Patent [19]
Allen et al.

[11] Patent Number: 4,670,971
[45] Date of Patent: Jun. 9, 1987

[54] MANUFACTURE OF ARMATURE WINDING CONDUCTORS

[75] Inventors: Derek E. Allen, Birmingham; Malcolm C. Woodward, Halesowen; Brian W. Cleaver, Tamworth, all of United Kingdom

[73] Assignee: Lucas Industries Public limited company, Birmingham, England

[21] Appl. No.: 874,584

[22] Filed: Jun. 16, 1986

Related U.S. Application Data

[63] Continuation of Ser. No. 698,564, Feb. 6, 1985, abandoned.

[30] Foreign Application Priority Data

Feb. 18, 1984 [GB] United Kingdom ................. 8404342

[51] Int. Cl.$^4$ ............................................ H02K 15/04
[52] U.S. Cl. ......................................... 29/597; 29/598; 228/173.5; 228/254; 310/234; 427/357; 174/74 R; 174/94 R

[56] References Cited

U.S. PATENT DOCUMENTS 3,124,709 10/1964 Jungle ................................. 310/234
3,451,836 6/1969 Spooner et al. ................. 427/357 X
3,750,265 8/1973 Cushman ........................ 228/255 X Primary Examiner—Carl E. Hall
Attorney, Agent, or Firm—Trexler, Bushnell, Giangiorgi & Blackstone, Ltd.

[57] ABSTRACT

A method of manufacturing an armature winding conductor including fusing brazing alloy onto the surface of the conductor, and, ensuring that the dimensions of the conductor, in the region carrying the alloy, are such that the conductor can pass through the slots of the armature core with which the windings are to be associated in use. The conductor is cut to length and bent to fit the armature either before or after the fusion step.

4 Claims, 5 Drawing Figures

MANUFACTURE OF ARMATURE WINDING CONDUCTORS

This application is a continuation of application Ser. No. 698,564, filed Feb. 6, 1985, now abandoned.

This invention relates to the manufacture of dynamo electric machine armature winding conductors, being particularly concerned with conductors of sufficient cross sectional area to be self-supporting and known generally as "hairpins".

Armature winding conductors of the kind with which the invention is concerned are intended for machine assembly into a respective armature, the conductors being inserted into respective slots of the armature core and terminating adjacent, or in contact with, respective segments of a commutator of the armature. In many armatures a pair of conductors lie radially above one another and an electrical and physical connection is to be made between the conductors and the respective commutator segment. Where only a single conductor is associated with each segment it is still necessary to provide an electrical and physical connection between the conductor and the segment. A preferred connection method is brazing using electrical resistance welding apparatus, and this necessitates the provision of a brazing alloy between the components to be connected. Thus where a single conductor is utilized brazing alloy is needed between the conductor and the commutator segment during the brazing operation, and where a pair of conductors are utilized then brazing alloy is needed between the two conductors, and between the radially innermost conductor and the commutator segment.

It is known to provide the brazing alloy by placing alloy inserts between the conductors, and between the conductor and the commutator segment in a similar manner to that shown in U.S. Pat. No. 3,124,709 which is concerned with the use of hard solder inserts. Such an arrangement is extremely disadvantageous when considering automated and mass production methods, since the inserts must be positioned between the appropriate components immediately before the resistance heating operation takes place. Even then there is a danger of misalignment of the brazing alloy insert, and a further danger of portions of the insert becoming detached during the brazing operation, and falling into contact with two adjacent segments thereby providing an electrical short circuit between those segments.

It has also been proposed to position and mechanically anchor brazing alloy inserts to the armature windings prior to assembly of the armature windings into the armature. However, passage of the armature windings through the slots of the core during assembly of the armature, and also, where the commutator segments have risers formed with slots for receiving the conductors, then passage of the conductors through the riser slots of their respective segments, has given rise to displacement of the alloy inserts resulting in a high failure rate in the automated manufacture of armature assemblies. It will be appreciated that an alloy insert once displaced not only gives rise to the risk of failure by virtue of a poor connection between the armature winding conductor and its respective commutator segment, but also by virtue of the displaced alloy insert short circuiting adjacent armature winding conductors.

It is an object of the present invention to minimise the aforementioned difficulties.

According to the present invention, a method of manufacturing an armature winding conductor includes, fusing brazing alloy onto the surface of the conductor, and ensuring that the dimensions of the conductor, in the region carrying the alloy, are such that the conductor can pass through the slots of the armature core with which the windings are to be associated in use.

Preferably the step of ensuring that the dimensions of the conductor are such that it can pass through the slot of the armature core with which it is to be utilized, includes performing a coining operation on the alloy layer fused to the conductor.

Conveniently the method includes the step of engaging a brazing alloy insert with the conductor, and locating the insert on the conductor in a predetermined position prior to fusing the insert to the conductor.

Preferably the method includes, prior to engaging the insert with the conductor, the step of cutting the conductor to an appropriate length, and bending the conductor to the appropriate shape for use as an armature winding conductor.

Alternatively a plurality of inserts are positioned at predetermined points along the length of an elongate conductor, and are fused to the conductor prior to cutting the conductor into a plurality of predetermined lengths each of which is then utilized as an armature winding conductor.

One example of the present invention will now be described with reference to the accompanying drawings, wherein.

Figure 1:
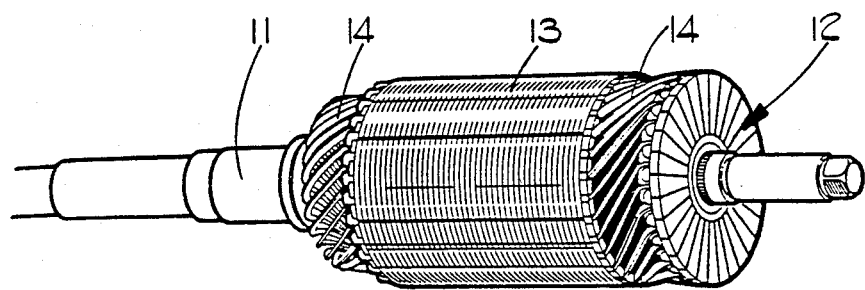
FIG. 1 is a perspective view of a conventional armature assembly.

Referring to the drawings, a known armature assembly includes a rotor shaft 11 carrying, adjacent one end thereof, a face commutator 12. Adjacent the commutator 12, and also non-rotatably mounted on the shaft 11 is a laminated armature core 13 having axially extending slots which may be of the closed, or semi-closed type. The slots of the core 13 receive armature winding conductors 14 and irrespective of whether or not the slots are of the closed, or semi-closed type, the conductors 14 are inserted axially along the length of their slots so that their free ends engage respective segments of the commutator 12 to which they are physically and electrically connected. The armature winding conductors 14 are each in the form of a "hairpin" of bent copper wire of rectangular cross-section. The cross-sectional area of the wire of the conductors 14 is such that the wire conductors are self-supporting. Thus the preformed hairpin can be inserted through the respective slots of the core 13 from the end of the core remote from the commutator 12. As is well known this procedure lends itself to automated assembly techniques, and after insertion through the core 13 the ends of the conductors projecting towards the commutator 12 may be bent as shown in FIG. 1 to align with their respective commutator segments. This subsequent bending is achieved as a part of the automatic assembly process, and does not require manual intervention.

Figure 5:
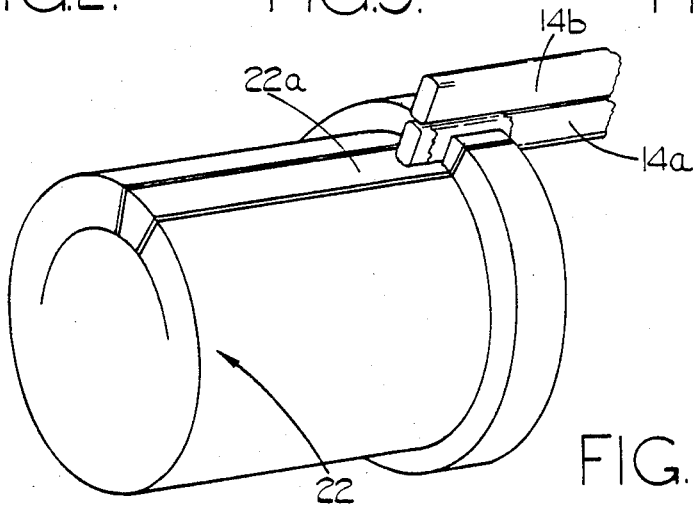
FIG. 5 illustrates the use of a conductor as shown in FIG. 4 in conjunction with a further conductor and a commutator segment.

In many armatures each slot of the core 13 will house a pair of conductors disposed one on top of the other in a radial direction. Such a pair of conductors is seen in FIG. 5 where the end region of the innermost conductor 14a is received in a slot of the riser of a segment 22a of a barrel type commutator 22. The end region of the radially outermost conductor 14b lies on top of the end region of the conductor 14a. Although FIG. 5 shows a barrel type commutator it is to be understood that a similar principle will be employed with a face type commutator, wherein the conductors 14a, 14b may both engage in a slot in the segment, or, may be arranged with only the conductor 14a engaged in the slot, or alternatively may be arranged so that the conductor 14a engages an outer surface of the segment, with the conductor 14b engaging the conductor 14a as shown in FIG. 5.

Figures 2, 3, 4:
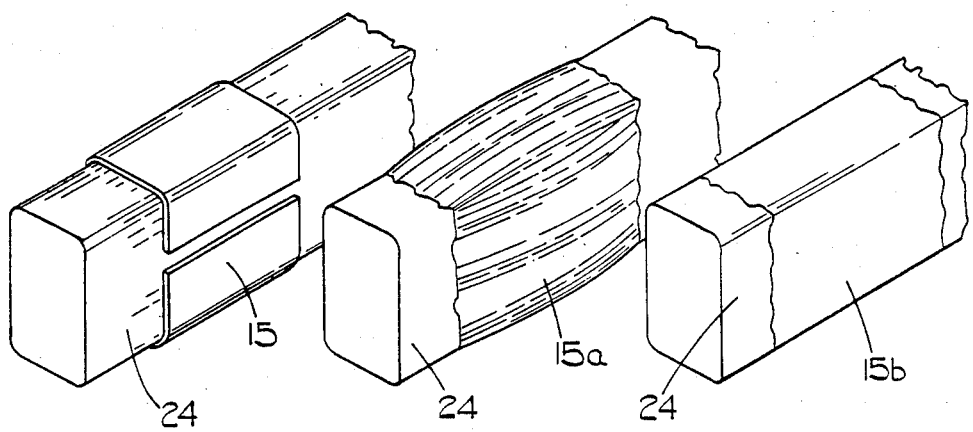
FIGS. 2, 3 and 4 illustrate respectively three stages of manufacture of an armature winding conductor for use in the assembly of the kind shown in FIG. 1.

Irrespective of the arrangement, that is to say whether a face commutator or a barrel commutator is used, and irrespective of whether or not there is only a single conductor, or a pair of conductors, it is nevertheless necessary to achieve a physical and electrical connection between the conductor or conductors and the commutator segment. This connection is usually achieved by brazing utilizing an electric resistance welding apparatus. In order to provide brazing alloy in the correct position on at least the innermost conductor 14a a method which will now be described with reference to FIGS. 2, 3 and 4 is utilized.

An elongate length 24 of copper wire of rectangular cross section, from which the conductors 14 will be formed, has engaged therewith a plurality of clips 15 formed from brazing alloy. Conveniently the brazing alloy is a silver/copper/phosphorus resistance brazing metal, desirably that sold under the trade name SIL-FOS. Each clip is in the form of a length of alloy strip which is bent to rectangular form so as to fit over, and lightly grip the conductor 24. As seen in FIG. 2 the clip of brazing alloy substantially embraces the conductor but has a discontinuity therein. The clips 15 are spaced at predetermined lengths along the conductor 24 and when correctly positioned each is heated to cause it to fuse to the surface of the conductor 24. The alloy is self-fluxing and conveniently is heated to cause it to fuse to the conductor 24 by the localized application of an electric resistance heating apparatus. During the heating operation the clip 15 fuses to form a bead 15a (FIG. 3) of molten brazing alloy encircling the chosen region of the conductor 24. As an incident to such fusing the discontinuity is eliminated as seen in FIG. 3. The molten bead is then allowed to cool and solidify, and of course bonds to the conductor 24. It is probable that the increase in dimension of the conductor 24 attributable to the solidified alloy bead 15a is such that the conductor could not pass through the appropriate slot of the armature core 13, nor could it pass through the appropriate slot, if one is provided, in the respective commutator segment. Thus the regions of the conductor 24 carrying the fused beads 15a are subjected to a coining operation to flatten each bead 15a to form a thin alloy layer 15b (FIG. 4).

The elongate length of conductor 24 is now cut at predetermined points along its length and the cut pieces are shaped to form the hairpin conductors 14. Thereafter, the hairpin conductors 14 are assembled into the armature assembly such that the conductors extend through the slots of the core 13 and terminate in contact with, or closely adjacent, their respective commutator segments. Where only single conductors are associated with each commutator segment and each armature core slot then the positioning of the clips on the conductor 24 will be such that the free end regions of both limbs of each hairpin conductor 14 have an alloy layer 15b thereon. This is because an alloy layer 15b will be necessary to achieve brazing of the end region of each limb of the hairpin conductor to its respective segment. However, more usually each armature slot will house a pair of conductors as shown in FIG. 5, and for each hairpin one limb will be the innermost conductor of its respective slot, while the other limb of the hairpin is the outermost conductor of its respective slot. Thus in such an arrangement only the limb of each hairpin which will be an innermost conductor in use, needs to be provided with the alloy layer 15b. It will be recognised that since the layer extends completely around the conductor limb then part of the layer will lie between the inner conductor and the commutator segment, and an opposite part of the layer will lie between the inner conductor and the outer conductor. There will thus be brazing alloy at both points where a brazed connection is needed.

In known manner a resistance welding apparatus will be applied to the conductor, or the outermost conductor, and to the commutator segment, and an electric current will be caused to flow between the outermost conductor and the segment while pressure is applied radially, thereby giving rise to a brazing operation at the or each interface, that is to say at the interface of the innermost conductor and the commutator segment, and if there is an outermost conductor, between the outermost conductor and the innermost conductor.

It will be recognised that the engagement and positioning of clips 15, the fusing of the clips 15, and the coining to form the layers 15b, together with the subsequent cutting and shaping lends itself to automation and mass production techniques. Thus the necessary brazing alloy can be provided in the desired position in a simple and convenient manner.

It will be recognised that if desired the conductor 24 could be cut to length prior to the engagement therewith of the clips 15. Thus if desired appropriate lengths of conductor 24 can individually have clips 15 applied thereto, each then being subjected to the necessary fusing and coining operation. The engagement of the clip or clips, fusing and coining operations can be performed on the individual lengths of conductor prior to, or subsequent to bending the individual lengths to form the hairpin armature winding conductors.

It will be understood that the foregoing method permits the provision on the conductors of an appropriate amount of correctly positioned brazing alloy in a simple and convenient manner. Moreover, since the alloy has already bonded to the conductor 14 it cannot be displaced by the insertion of the conductor 14 into the armature assembly, nor can parts thereof become detached during the resistance brazing operation, thereby greatly minimizing the risk of inadvertant short circuiting of conductors or commutator segments.

It will be recognised that the end regions of the conductors 14 may be subject, if necessary, to a trimming operation either before or after securing to the commutator segments.

We claim:

1. A method of manufacturing an armature winding conductor including applying a clip of brazing alloy of a limited length to the conductor in embracing, substantially encircling relation but having a discontinuity therein, thereafter fusing said brazing alloy onto a discrete area of the surface of the conductor and eliminating said discontinuity as an incident to said fusing to produce complete encirclement, and, ensuring that the dimensions of the conductor, in the region carrying the alloy, are such that the conductor can subsequently pass through the slots of the armature core with which the windings are to be associated, and thereafter utilizing the encircling brazing alloy to braze armature structure to said conductor on opposite sides thereof.

2. A method as claimed in claim 1 wherein the step of ensuring that the dimensions of the conductor are such that it can pass through the slot of the armature core with which it is to be utilized, includes performing a coining operation on the alloy layer fused to the conductor.

3. A method as claimed in claim 1, including prior to engaging the clip with the conductor, the step of cutting the conductor to an appropriate length, and bending the conductor to the appropriate shape for use as an armature winding conductor.

4. A method as claimed in claim 1 or claim 2 including the subsequent step of bending the conductor to the appropriate shape for use as an armature winding conductor.

* * * * *